United States Patent [19]
Yokota

[11] Patent Number: 5,355,621
[45] Date of Patent: Oct. 18, 1994

[54] HIGH-DENSITY TYPE CULTIVATION EQUIPMENT

[75] Inventor: Mamoru Yokota, Shizuoka, Japan

[73] Assignee: Yazaki Industrial Chemical Co., Ltd., Shizuoka, Japan

[21] Appl. No.: 24,485

[22] Filed: Mar. 1, 1993

[51] Int. Cl.$^5$ .............................................. A01G 31/02
[52] U.S. Cl. ........................................... 47/65; 104/48
[58] Field of Search ................ 104/48; 47/65, 17 MS, 47/650

[56] References Cited

U.S. PATENT DOCUMENTS

| | | | |
|---|---|---|---|
| 1,610,366 | 12/1926 | Fox | 104/48 |
| 2,634,690 | 4/1953 | Clingan | 104/48 |
| 3,913,758 | 10/1975 | Faircloth | 104/48 |
| 4,216,615 | 8/1980 | Söderberg | 47/65 D |
| 5,097,770 | 3/1992 | Miyashita | 105/72.2 |

FOREIGN PATENT DOCUMENTS

| | | | |
|---|---|---|---|
| 228688 | of 0000 | Japan . | |
| 256048 | of 0000 | Japan . | |
| 9100361 | 9/1991 | Netherlands | 47/65 D |
| 1732873 | 5/1992 | U.S.S.R. | 47/65 D |

Primary Examiner—Henry E. Raduazo
Attorney, Agent, or Firm—Dellett and Walters

[57] ABSTRACT

A high-density type cultivation equipment has an improved mechanism to transfer cultivation beds from one main rail track to the adjacent main rail track, in which transfer rail tracks 1 that connect ends of main rail tracks 3 consist of two pairs of parallel feed rollers 1' that are rotated in a common direction at an identical velocity, are arranged with a track gauge related to the distance between wheels which cross said main rail tracks with an angle declined from a right angle by a feed angle α at substantially the same height with said main rail tracks. The wheels 15 of cultivation beds B have the axles 15a thereof fixed in direction to be perpendicular to the central axes of the main rails. As means to drive said cultivation beds B along the main rail tracks 3 in a cyclic path, hook means 4 that detachably engage with structural members 10 of said cultivation beds B are provided to be driven in the direction parallel to the main rail tracks 3. The cultivation beds that have reached the end of one of the main rail tracks are transferred to the adjacent main rail track automatically, thereby enhancing effectiveness of mechanized concentrated agriculture.

15 Claims, 12 Drawing Sheets

HIGH-DENSITY TYPE CULTIVATION EQUIPMENT

BACKGROUND OF THE INVENTION

This invention relates to a high-density type cultivation equipment which is used in mechanized concentrated agriculture such as hydroponics, greenhouse floriculture, and so on and which utilizes almost the whole site area to cultivation, or more particularly to a high-density type cultivation equipment that has an improved mechanism for transfer a cultivation bed from one main rail track to another.

High-density type cultivation equipment that utilize almost the whole site area to cultivation is disclosed in JPH 2-56048 and JPH 2-28688, for example, and is well-known.

The high-density type cultivation equipment described in said JPH 2-56048 has a plurality of cultivation beds arranged in dense rows on main rail tracks and can maintain a single passage between any selected two adjacent beds which is of a width suitable for carrying out agricultural work and in which can be provided a carrier wagon for agricultural use to span the passage on rail elements that serve also as structural members of the cultivation beds on the both sides of the passage. In this high-density type cultivation equipment, the beds make reciprocal movement only to make clearance for a passage and do not move in a cycle. The workers, therefore, must be in the greenhouse and move in a cycle along the rows of beds in order to do agricultural work such as the treatment of plants and harvesting. Under such severe labor conditions, work efficiency is naturally poor and the merits of mechanization and labor-saving are very limited.

In the high-density type cultivation equipment described in JPH 2-28688, the cultivation beds are provided in rows on a plurality of main rail tracks laid in parallel position with the minimum clearance therebetween necessary to avoid mutual interference between cultivation beds on two adjacent tracks. At both ends of the main rail tracks are provided transfer wagons which transfer the cultivation beds arriving at the ends of one of the main rail tracks onto the adjacent main rail track. This high-density type cultivation equipment has a big merit of labor saving and mechanization, since the cultivation beds move in cyclic paths and workers do not have to move around in the greenhouse but can stay in a particular position to do agricultural work such as plant treatment and harvesting. But, since the transfer wagons, which transfer cultivation beds which arrive at the end of one of the main rail tracks to the adjacent rail pairs, are indispensable and said transfer wagons must transfer the cultivation beds in a shuttle motion, the space necessary for return travel must be subtracted from the cultivation area and the time loss thereby caused reduces the efficiency. And further, providing of the transfer wagons and the control system pushes up the cost.

The primary object of the invention is to provide high-density type cultivation equipment wherein the cultivation beds that reach the end of one of main rail tracks can be transferred to the adjacent main rail track automatically, and which, since the tranferring mechanism is able to be provided without occupying any substantial area, enhances effectiveness of mechanized concentrated agriculture.

Another object of the invention is to provide high-density type cultivation equipment which dispenses with all of the agricultural work passages and hence can utilize almost the whole site area for cultivation, thereby increasing harvest and profits.

A further object of the invention is to provide a high-density type cultivation equipment wherein movement of the cultivation beds is effected easily to equalize growing of plants and which, through the simple structure of the equipment and ease of automatization, relieves the workers from severe labor conditions of high temperature and high humidity and thereby contributes to efficient and stable agricultural work and to reduction of labor.

SUMMARY OF THE INVENTION

The high-density type cultivation equipment according to the invention has a plurality of cultivation beds provided in rows to be movable on plural main rail tracks which are arranged in parallel with the minimum spacing therebetween necessary to avoid mutual interference of said cultivation beds and a mechanism to transfer the cultivation beds that reach the end of one of said main rail tracks to the adjacent main rail track, with the characteristics as described hereinbelow.

Transfer rail tracks of the cultivation beds that connect a main rail track to an adjacent main rail track comprise two pairs of feed rollers that are arranged with a track gauge related to the spacing between the fore and rear wheels of the cultivation beds. The transfer rail track cross the main rail tracks with an angle declined from a right angle by a feed angle and are positioned at substantially the same height with the main rail tracks. A means to drive the rollers to rotate in a common direction at an identical velocity is also provided. The four wheels of the cultivation beds are arranged to be positioned on the four corner points of the parallelogram formed by a main rail track and a transfer rail track with the axles fixed in direction perpendicular to the main rail tracks. As a means to drive a cultivation bed that has moved on the transfer rails to the adjacent main rail track in a cyclic path, hook means that can be detachably engaged with structural members of the cultivation bed are driven with a required stroke parallel to the main rail track. In some cases, the invention can be embodied to have main rails that are flat lanes or lanes of a concave section and the wheels of rubber tire or flat-rim wheels that run in said lanes. Further the invention can be embodied to have a cultivation bed transfer rail track that connect a main rail track to the adjacent main rail track thereof at the middle part of said main rail tracks, said transfer rail tracks comprising two pairs of feed rollers that are arranged with a track gauge related to the spacing between the fore and rear wheels of the cultivation. The transfer rail tracks cross the main rail tracks with an angle different from a right angle by a feed angle and are at substantially the same height with the main rail track. Means to drive the rollers to rotate in the same direction and at the same velocity are provided to drive a cultivation bed that has moved on the transfer rail track at the middle of the main rail tracks from one main rail track to the adjacent track in the direction of the cyclic path along the main rail track, hook means that can be detachably engaged with a structural member of the cultivation bed are provided, driven by a driving device with a required stroke parallel to the main rails.

In the equipment according to the invention, when a cultivation bed reaches the end of one of the main rail tracks, the four wheels thereof come onto the pairs of the feed rollers constituting the transfer rails and, since each pair of said feed rollers rotate in the same direction at the same velocity, the cultivation bed is shifted laterally to the adjacent main rail track owing to an action similar to screw action exerted on the wheels due to the feed angle. For the purpose of harvesting or others work, it is possible to move a cultivation bed on the transfer rail track out of the cultivation equipment.

The cultivation bed that has reached the adjacent main rail track as described above, is advanced by a step in stroke motion along the main rail track by motor-driven hooks that come into engagement with structural members of the cultivation bed. In this way, the cultivation beds pushed forward in turns on the plurality of the main rail tracks to move in the cyclic path for cultivation and control of plants. Hence there is no need for greenhouse workers to enter the cultivation lot (or the greenhouse) and move around to attend each cultivation bed.

Another type of the high-density type cultivation equipment according to the invention possesses the following characteristics:

The main rail tracks of pairs of parallel feed rollers are arranged with a track gauge equal to the lateral spacing of the wheels of the cultivation bed, and are provided with driving means for the feed rollers. The transfer rail tracks that connect the end of each of said main rail track to the adjacent main rail track have a track gauge that is related to the distance between the fore and rear wheels of the cultivation beds and are arranged in such a manner that they cross the main rail track at a right angle and are substantially at the same height therewith. The remaining part of the composition of this type of equipment is the same with the cultivation equipment described above.

In this second cultivation equipment, since the main rail tracks consist of pairs of parallel feed rollers, the cultivation beds, which have wheels on the main rail track, are forced to move in the cyclic path along the main rail track as a result of the feeding action similar to screw action exerted on the wheels by the rollers that rotate in the same direction at the same velocity. In this cultivation equipment, therefore, the cultivation beds move smoothly in the cyclic path even if they are not in dense rows so as to push one another on the main rail track but instead are longitudinally spaced in arbitrary relation to each other.

Further, in the second cultivation equipment, the transfer rail tracks can be flat lanes or lanes of a concave section and the wheels of the cultivation beds can be rubber tire or flat-rim wheels that run in said lanes. It is also possible to embody the present invention to comprise transfer rail tracks of cultivation beds that connect each of the main rail tracks to the adjacent main rail track at the middle part of said main rail tracks, have the same track gauge that is related to the spacing between the fore and rear wheels of the cultivation beds and which cross the main rail tracks at a right angle at substantially the same height with the main rail tracks, and driving means to transfer the cultivation bed that has reached the end of one of the main rail tracks to the adjacent main rail track along the transfer rail track.

It is also possible to modify first and second cultivation equipment described above into other embodiments wherein the main or transfer rails that consist of pairs of feed rollers are provided with helical ribs or grooves formed on the outer surfaces thereof and having a predetermined constant lead angle. The main and transfer rails cross each other at a right angle and the wheels of the cultivation beds are arranged in such a way that when they come precisely on the four corner points of the rectangle formed by the main and transfer rail tracks, the axles thereof are fixed in direction to be parallel to the central axes of said feed rollers.

BRIEF DESCRIPTION OF THE DRAWINGS

To make the invention be understood better and to show how it is embodied, embodiments thereof will be described with reference to the accompanying drawings wherein.

DETAILED DESCRIPTION OF PREFERRED EMBODIMENT

Hereinafter, the composition, functions, operations and the other characteristics of the invention will be described in detail referring to the drawings.

Figure 1:
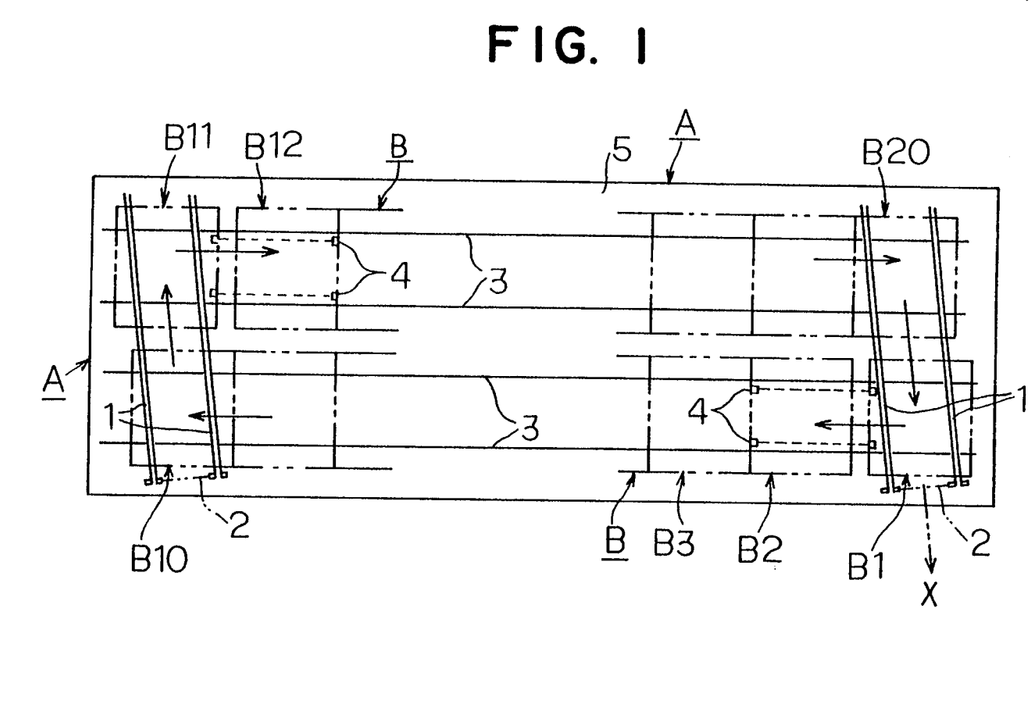
FIG. 1 is a plan view of a simplified model of a high-density type cultivation equipment showing the structure thereof.

The high-density type cultivation equipment shown in FIG. 1 has a plurality of cultivation beds B arranged in dense rows and adapted to move in a cyclic path on plural main rail tracks 3 that are arranged on a site area A to use the full width thereof. In some cases, said site area A may be mean the inside of a greenhouse. The rails 3 of each main rail track are arranged to be parallel with the adjacent main rail track, with the minimum spacing therebetween necessary to avoid interference between cultivation beds on two adjacent tracks. The main rails 3 are preferably made of a resin-coated circular metal pipe of outer diameter of 28 or 32 mm made by, for example, coating a thin homogeneous film of a synthetic resin on the outer surface of a thin steel pipe, and are laid on base frames substantially horizontally through support of coupling members 17, said frames being constructed by connecting beams 12 with props 13 that are erected on the ground 16 and have a height suited for workers to carry out agricultural work. The cultivation bed B consists of a cultivation tray 18 placed on a bed frame that is also constructed from said resin-coated metal pipes and has rail casters 15 or wheels attached at the end of legs 19. The rail casters 15 have a flange on each side thereof to flank the main rail 3 therebetween (see FIG. 2 and FIG. 4A).

Figure 2:
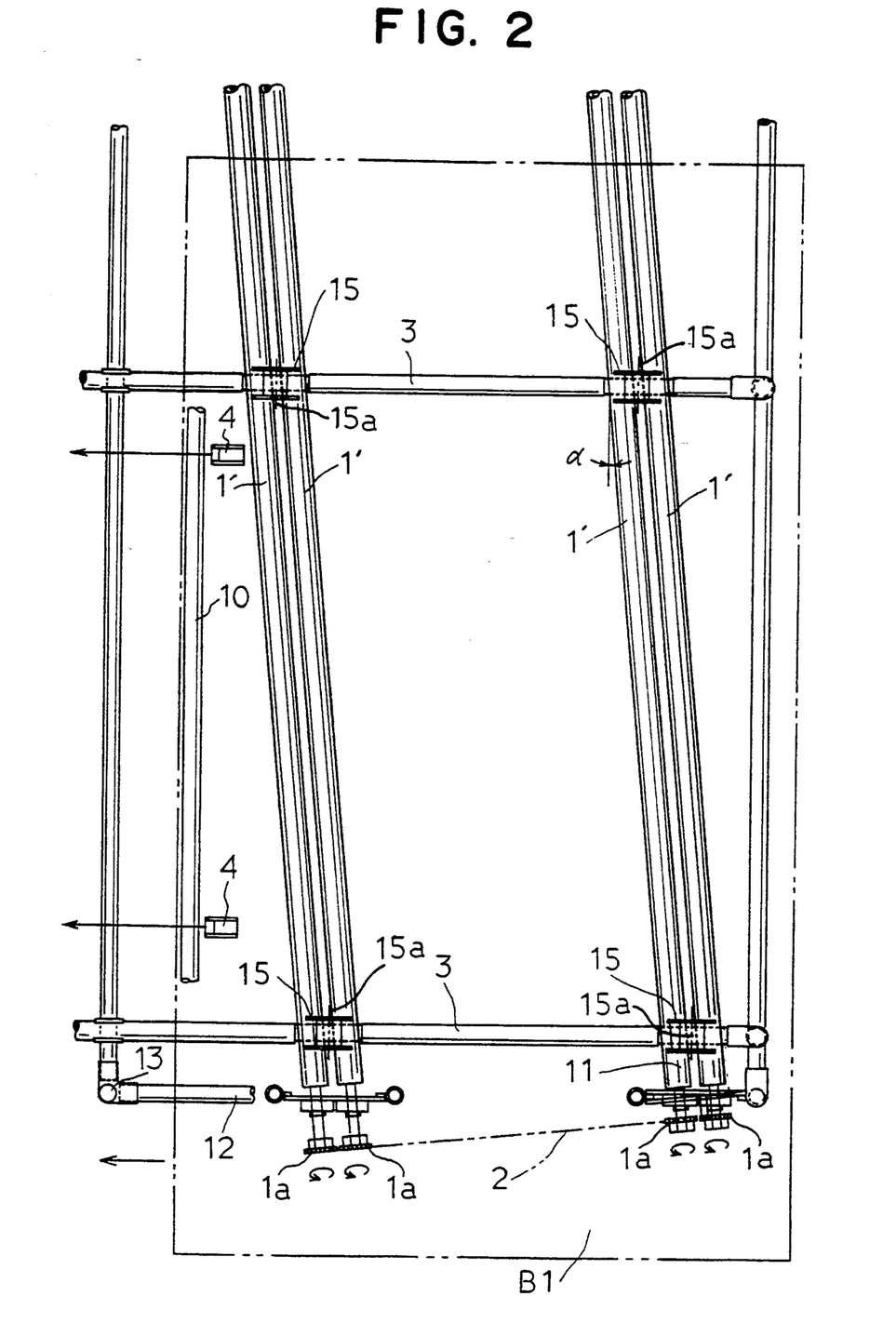
FIG. 2 is plan view showing the relation between the wheels of the cultivation beds and the main and transfer rail tracks.
Figure 3:
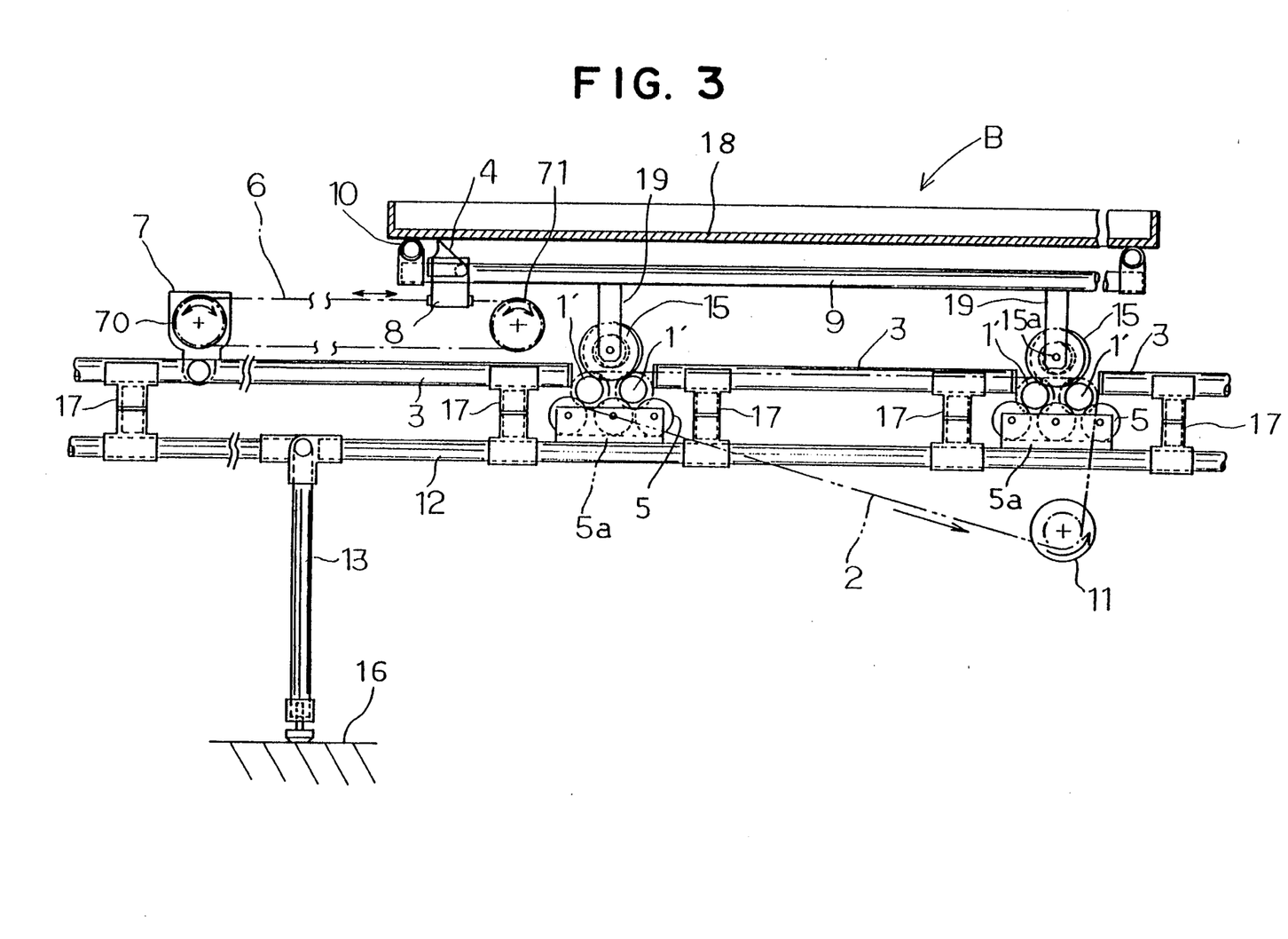
FIG. 3 is a side view showing the same as FIG. 2.
Figure 4A:
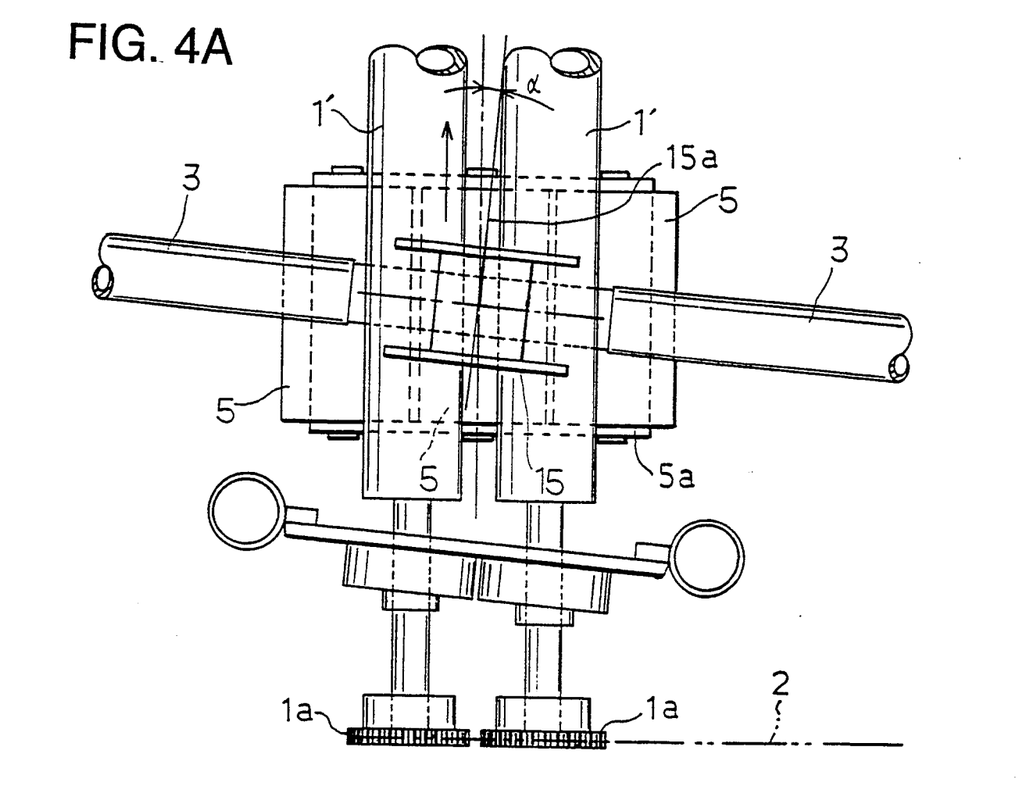
FIGS. 4A and 4B are a plan view (A) and a side view (B) respectively showing the relation between the feed rollers and the main rail.
Figure 4B:
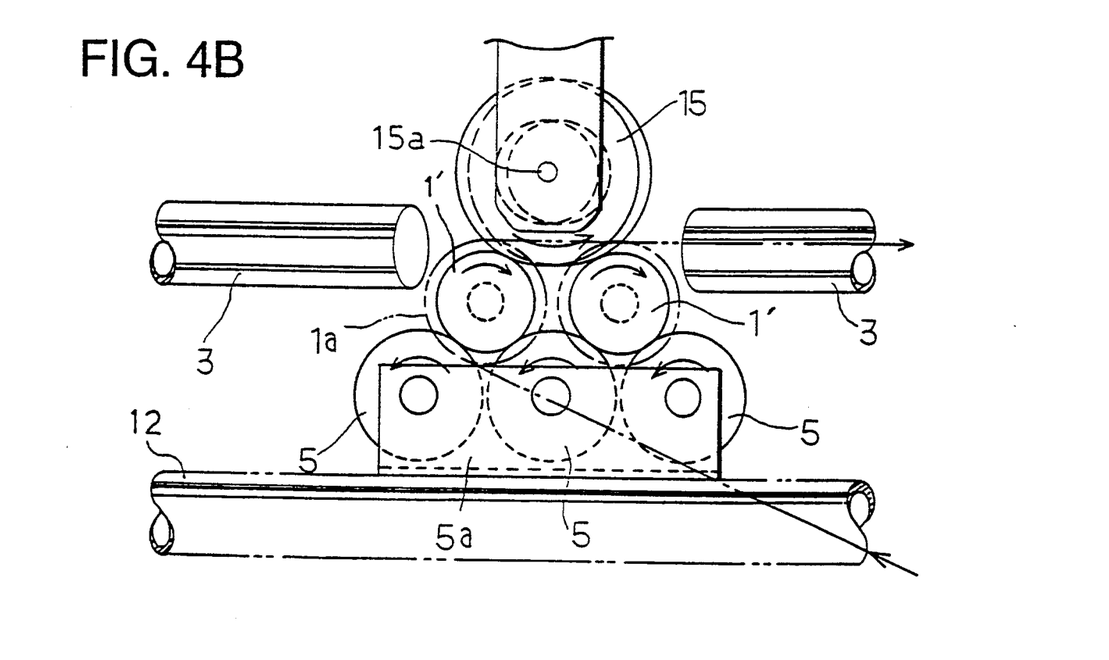

To transfer a cultivation bed that has reached the end of the main rail track 3 (see, for example, $B_{10}$ or $B_{20}$ of FIG. 1) to the adjacent main rail track, transfer rail tracks 1 are provided. The detailed structure thereof is, as shown in FIG. 2 through FIG. 4, such that each rail consists of a pair of feed rollers 1',1' of an identical length and diameter that rotate in a common direction at an identical velocity. The transfer rail track has a track gauge related to the spacing between the fore and rear rail casters 15,15, and, being provided at substantially the same height with the main rail tracks 3, crosses the main rail tracks at an angle declined from a right angle by a feed angle $\alpha$. Said pair of feed rollers 1',1' are made of resin-coated metal pipes having an of outer diameter of about 42 mm, are arranged to be parallel to each other with a little space therebetween, and are positioned on three support rollers 5 provided in a cut-off part of the main rails that is nearly as wide as the feed roller pair(see FIG. 3 and FIG. 4B). Said support rollers 5 are provided on the line of the main rail 3 and bearing members 5a thereof are fixed to said beam 12. Said feed angle $\alpha$ is set to about 5 degrees as seen in a plan view. The driving means to rotate the pair of feed rollers 1',1' in the same direction at the same velocity consists of a chain sprocket 1a attached to the end of the roller 1' and a chain 2 mounted around said sprocket, said chain 2 being driven by a motor 11.

The four rail casters 15 of the cultivation bed B are, as shown in FIG. 2 and FIG. 4A, arranged to come on the four corner points of the parallelogram formed by crossing of a main rail track and a transfer rail track, and the axles thereof are fixed in direction to form an angle with the central axis of the feed rollers equal to said feed angle $\alpha$.

Thus, as cultivation beds B that have moved on one of the main rail tracks 3 reach one of the transfer rail tracks 1,1 shown as $B_{10}$ and $B_{20}$ in FIG. 1, and the fore and rear rail casters 15,15 get on the pairs of feed rollers 1',1' as shown in FIG. 2, sensors (not shown) detect this condition, and the feed rollers 1',1' are driven to rotate by a motor 11 according to the detected signals. Then, the cultivation beds at $B_{10}$ and $B_{20}$ are moved to the positions on the adjacent main rail tracks as shown $B_{11}$ and $B_1$ respectively in FIG. 1 by the feeding action similar to screw action, exerted on the flanges of the rail caster 15 in the direction of the axis of the feed rollers through rotation of the feed rollers 1' owing to the fact that the axle 15a of the rail caster 15 is declined with respect to the central axis of the roller 1' by the angle $\alpha$. But, for harvesting or other purposes, it is possible to move the cultivation bed B beyond the adjacent main rail track out of the equipment as designated by X in the Figures.

Figure 5:
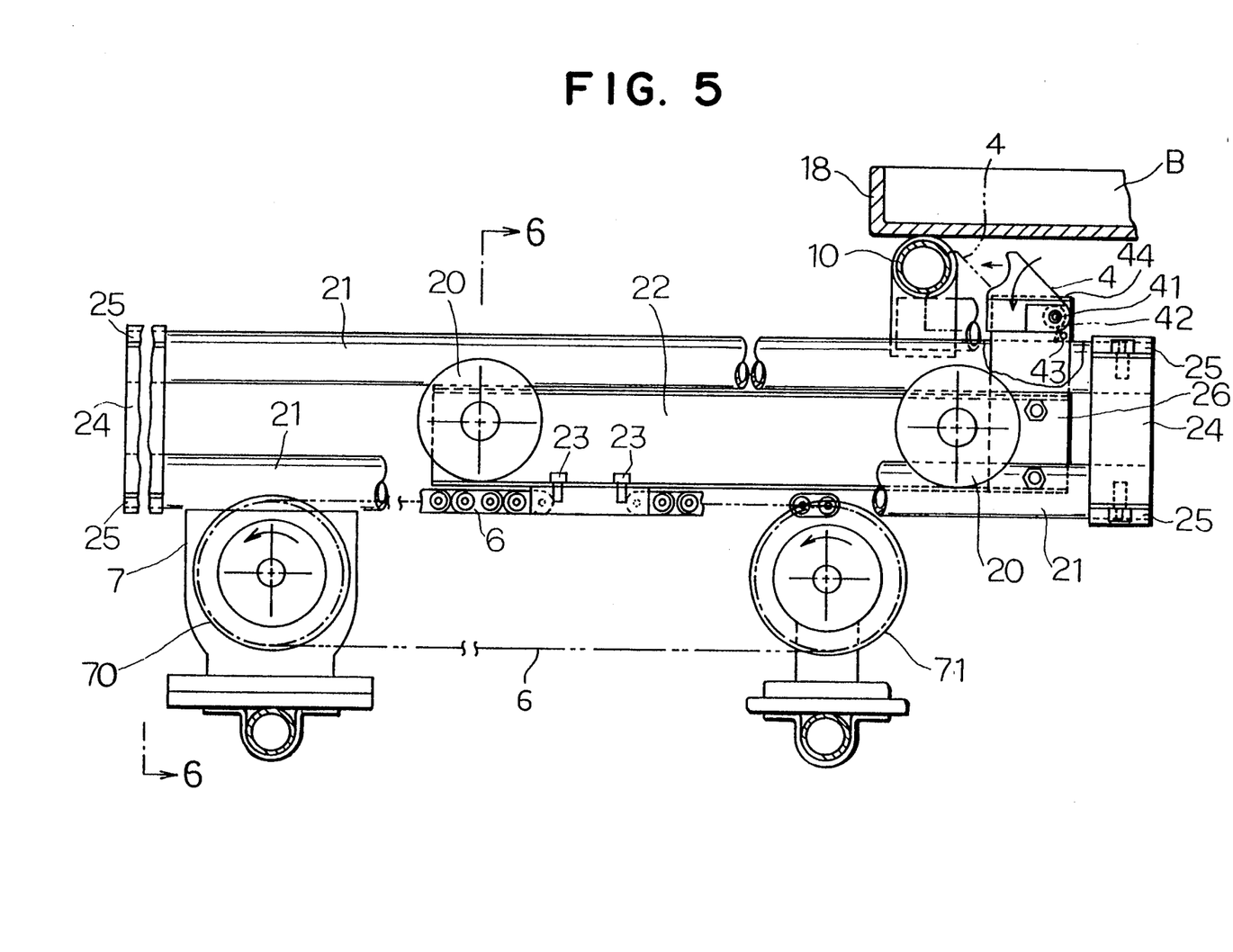
FIG. 5 is a side view of a driving means having a hook.
Figure 6:
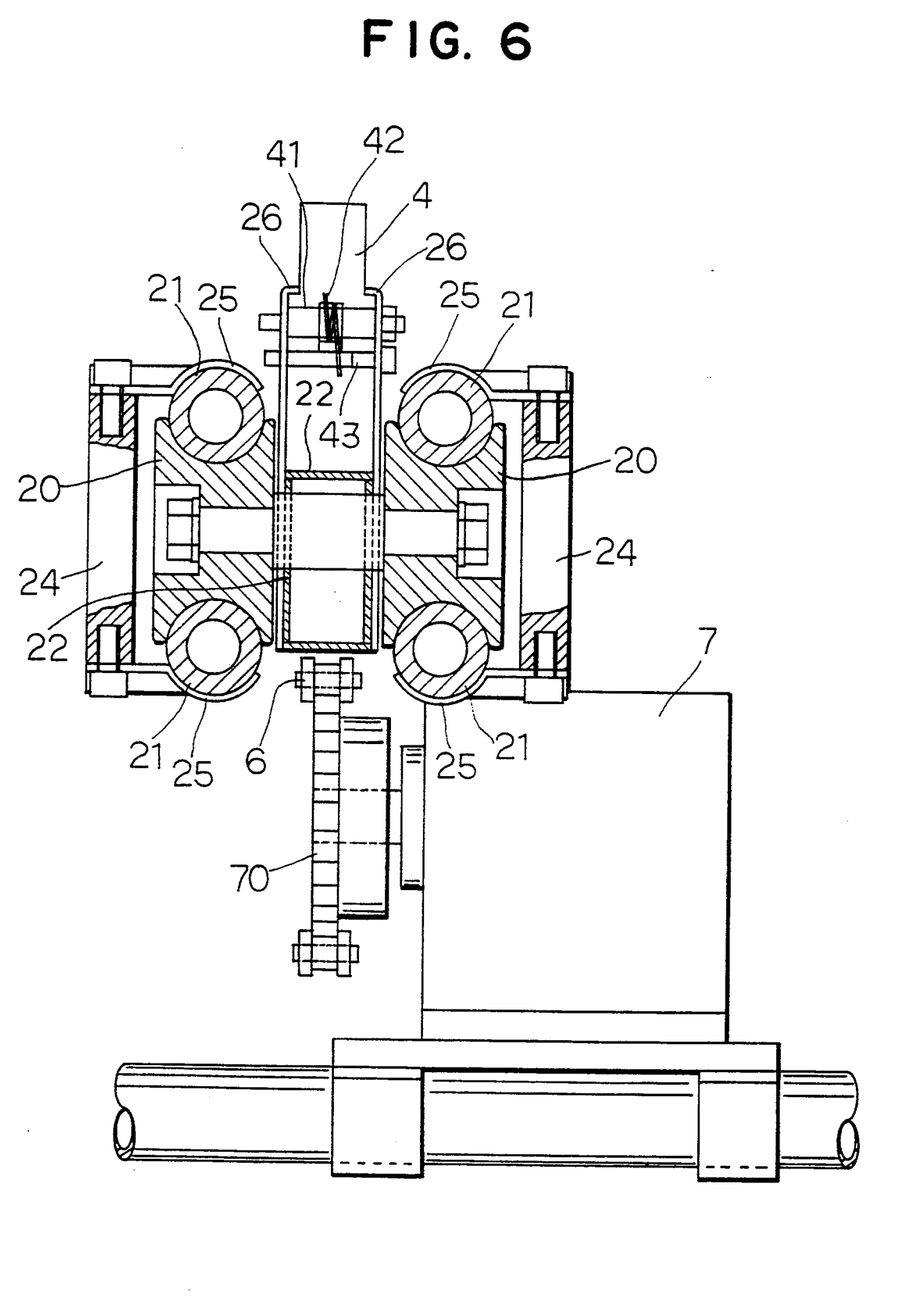
FIG. 6 is section taken at the line 6—6 of FIG. 5.

The completion of transference of the cultivation beds to $B_{11}$ or $B_1$ is also detected by sensors that are not shown. In response to the signals from said sensors, hooks 4 that are means to move the cultivation beds B forward in the cyclic path along the main rail tracks 3 are actuated and, as shown in FIG. 3 and 5, engage with side beams 10 that are structural members of the cultivation beds B. Two of said hooks 4 are preferably provided inside each pair of the rails 3,3 of the main rail track to be parallel therewith as shown in FIG. 2, and each is attached to a horizontal chain 8 that is put around a driving sprocket 70 driven by a motor 7 and a driven sprocket 71 (see FIG. 3). Each of said hooks 4 is driven by said motor 7 by a stroke necessary and sufficient to advance one of the cultivation beds B by 1 step in the direction of the cyclic path along the main rail track The driving sprocket wheel 70 and the driven sprocket wheel 71 are arranged with a greater distance therebetween than said required stroke. As the structure is shown concretely in FIG. 5 and 6, a portion of said chain 6 is constrained by screws 23 under a reciprocal wagon 22 that is constructed as a rectangular pipe and provided with free wheels at the four corners thereof which run along horizontal upper and lower rails 21,21 that are parallel to the main rails 3. Said upper and lower rails 21,21 are held by rail holders 25 that are fixed to the upper and lower ends of spacers 24. At the upper end of a vertical stand 26 provided behind the reciprocal wagon 22 is attached said hook 4. A torsion coil spring 42 is attached to a rotation axle 41 with one end thereof being fixed to the hook 4 and the other end catching a stop bolt 43 provided in said stand 26. It is possible for the hook 4 to rotate counterclockwise from the position shown in solid line in FIG. 5 to the position where it can duck under the side beam 10 of the cultivation bed B, but it is always urged to the original solid-line position in FIG. 5 by said torsion coil spring 42. However, the hook 4 is prevented from turning in the clockwise direction by a positioning stopper 44 formed on the stand 28. Thus, as the motor 7 moves the chain 6 forward from the position shown in FIG. 3 and 5, the hook 4 runs against the side beam 10, and advances the cultivation bed B in the cyclic path by pushing against the side beam 10. As the cultivation bed B moves forward one step in a stroke, the motor 7 is stopped by a signal from the sensor that detects the arrival of the cultivation bed B at said advanced position, and then the motor 7 is driven in the reverse direction to return the hook 4 to the original position. During said retracting movement, the hook 4 encounters the side beam 10 of a cultivation bed B that is either at $B_1$ of $B_{11}$ of FIG. 1, but the hook 4 ducks under this side beam 10 through a counterclockwise turn about the axle 41 as seen in FIG. 5 and returns to the position shown in solid line in FIG. 5. The driving means to reciprocate the hook 4 is not restricted to the above described mechanism comprising said chain 6 and motor 7. If spatial and financial problems can be solved, a feed mechanism utilizing a hydraulic cylinder or a rotating threaded shaft may be adopted.

Figure 7:
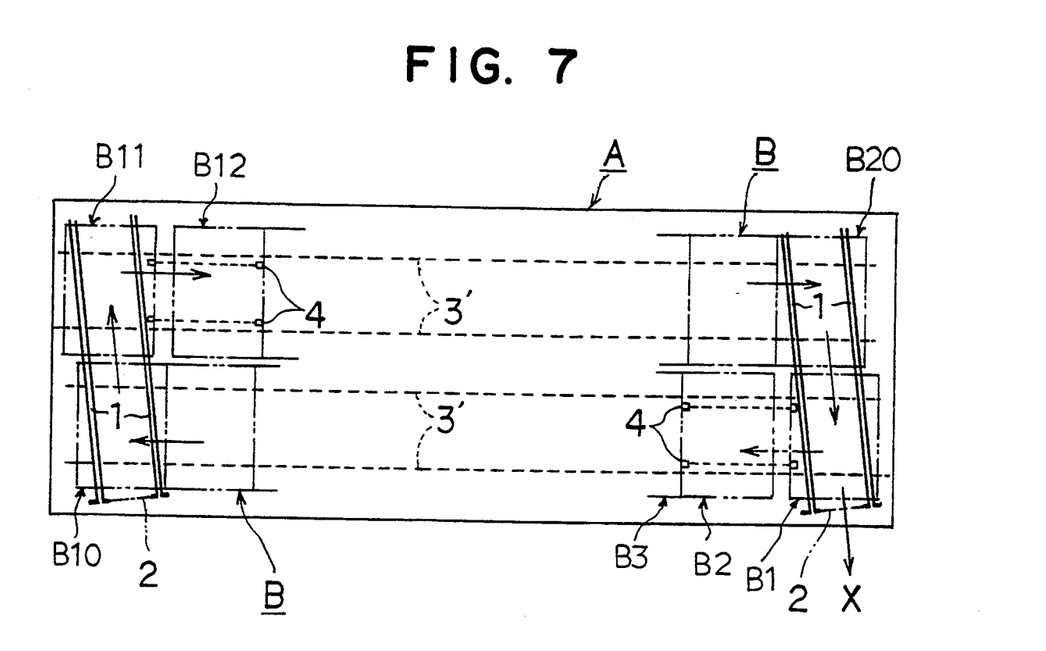
FIG. 7 is a plan view showing a simplified model of a second embodiment of the high-density type cultivation equipment.
Figure 8:
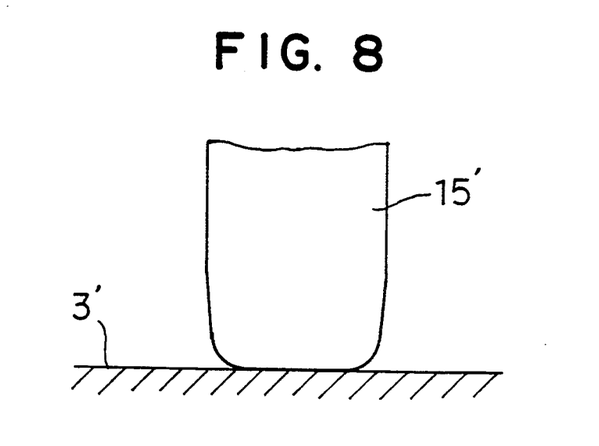
FIG. 8 is a front view showing the relation between a flat lane and a wheel.

FIG. 7 shows an embodiment in which, instead of the main rails comprising resin-coated steel pipes described with reference to FIG. 1 and FIG. 2 through FIG. 4A and 4B, flat lanes 3' such as shown in FIG. 8 (or lanes of a concave section) are employed and, for the wheels of the cultivation beds B, rubber tyre wheels or flat-rim wheels that are suited to run on said lanes 3' are used. The flat lanes 3' are formed from flat plates, square pipes, H-beams or the like. The lanes of a concave section are formed using U-channels, H-beams or the like.

Also in this embodiment of the invention, the wheels 15' of the cultivation bed B which has reached the ends of the flat lanes 3' that serve as the main rails, come onto the transfer rails 1 wherein the transfer nails consists of a pair of feed rollers, and the bed is transferred to the rails (the lanes 3') of the adjacent main rail track, and thus the cyclic movement of the cultivation beds B is realized.

Figure 9:
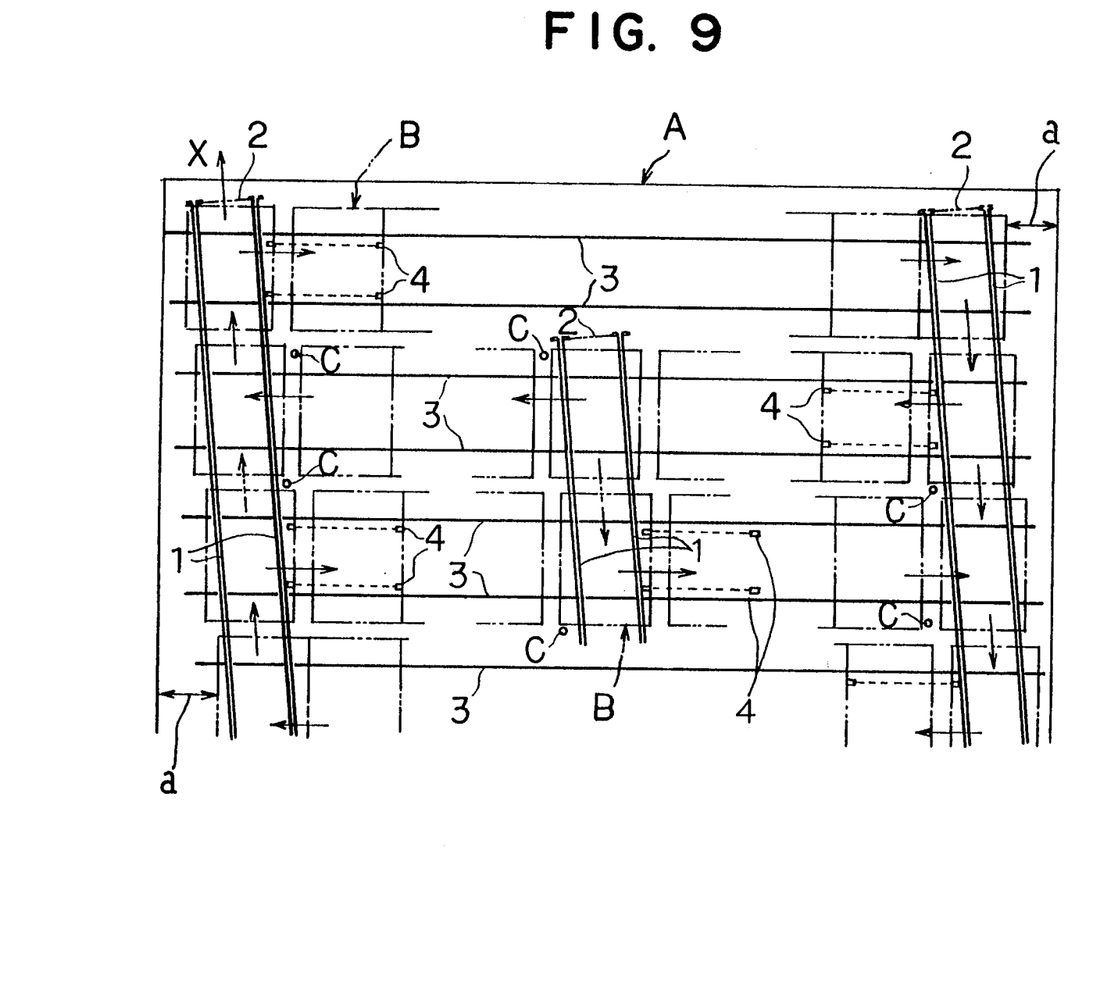
FIG. 9 is a plan view showing a simplified model of a third embodiment of the high-density type cultivation equipment.

Next, FIG. 9 shows an embodiment of the invention that is an extended version. of the embodiment described above and shown in FIG. 1 and 7. This embodiment is provided with many main rail tracks as in cages of large-scale farms, and has an intermittent transfer rail track 1 for the cultivation beds B that connects one main rail track 3 with the adjacent main rail track 3 at the middle of the main rails 3 (or lanes 3'). This intermittent transfer rail track, like the transfer rail tracks at the ends of the main tracks, comprises two pairs of feed rollers that rotate in a common direction at the same velocity and cross the main rail tracks 3 with an angle inclined from a right angle by a feed angle at substantially the same height with the main rail tracks 3. The intermittent transfer rail tracks have a track gauge related to the spacing between the fore and rear wheels of the cultivation beds B. A sensor C is provided to detect the arrival of a cultivation bed B at the adjacent main rail track 5 after moving on the intermittent transfer rail track. As a driving means for moving the cultivation bed B forward in the cyclic path in response to the signal detected by said sensor C, hook means 4 are provided that engage detachably with a structural member of the cultivation bed B, are driven by a driving means in a step by step in stroke motion in the direction parallel to the main rail tracks 3. The utility of this intermittent transfer rail track 1 is that the growth rate of plants can be controlled by selectively extracting cultivation beds B having under-grown plants halfway in the cyclic path from a main rail track to the adjacent main rail track 3, that is, into a backward group of cultivation beds using the intermittent transfer rail track 1, thereby giving them time necessary to catch up in growth.

Figure 10:
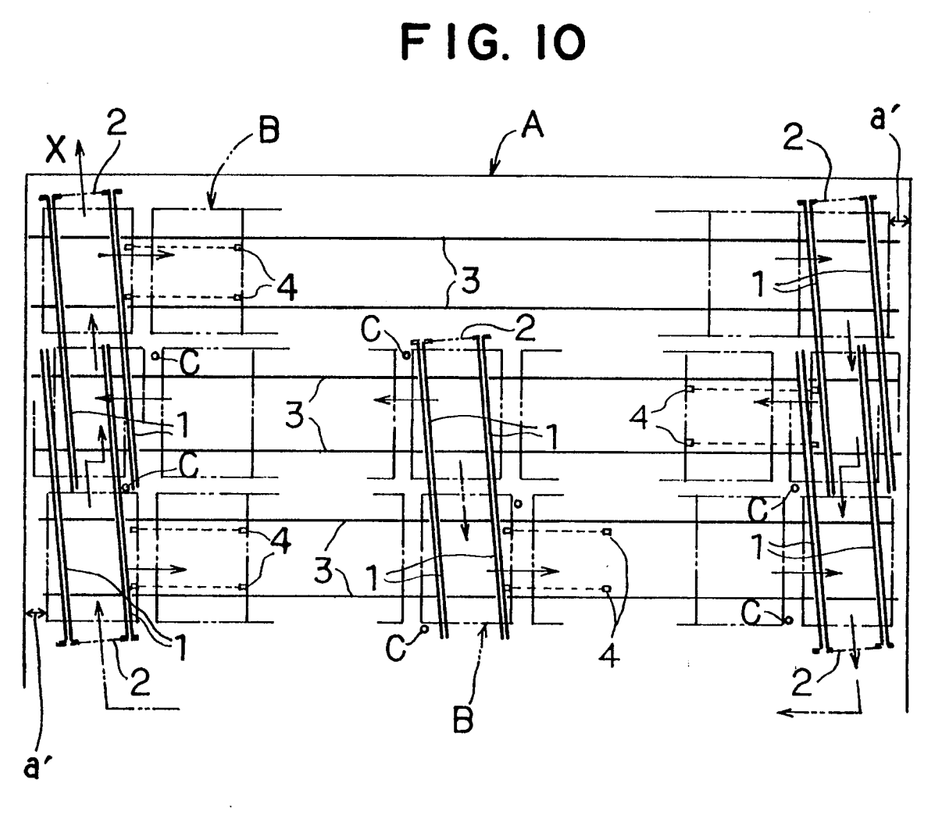
FIG. 10 is a plan view showing a simplified model of a fourth embodiment of the high-density type cultivation equipment.

Next, FIG. 10 shows an embodiment of the invention also applied to a large-scale farm having many main rail tracks 3 and hence long transfer rail tracks 1. In this embodiment, however, the transfer rail tracks are arranged discontinuously in a staggered pattern with each track having a length just enough to stride two adjacent main rail tracks as measures to avoid reduction of the rate of utilization of the site area A due to said feed angle $\alpha$ ( see, for example, the width of the dead spaces between the transfer rail tracks and the boundary of the site of FIG. 9). In this way, the transfer rail tracks can be arranged as near to the boundary of the site as possible to reduce the influence of the feed angle $\alpha$ and hence the dead spaces and thereby to increase the rate of utilization of the site area A (compare the width of a of FIG. 9 with that of a of FIG. 10).

Figure 11:
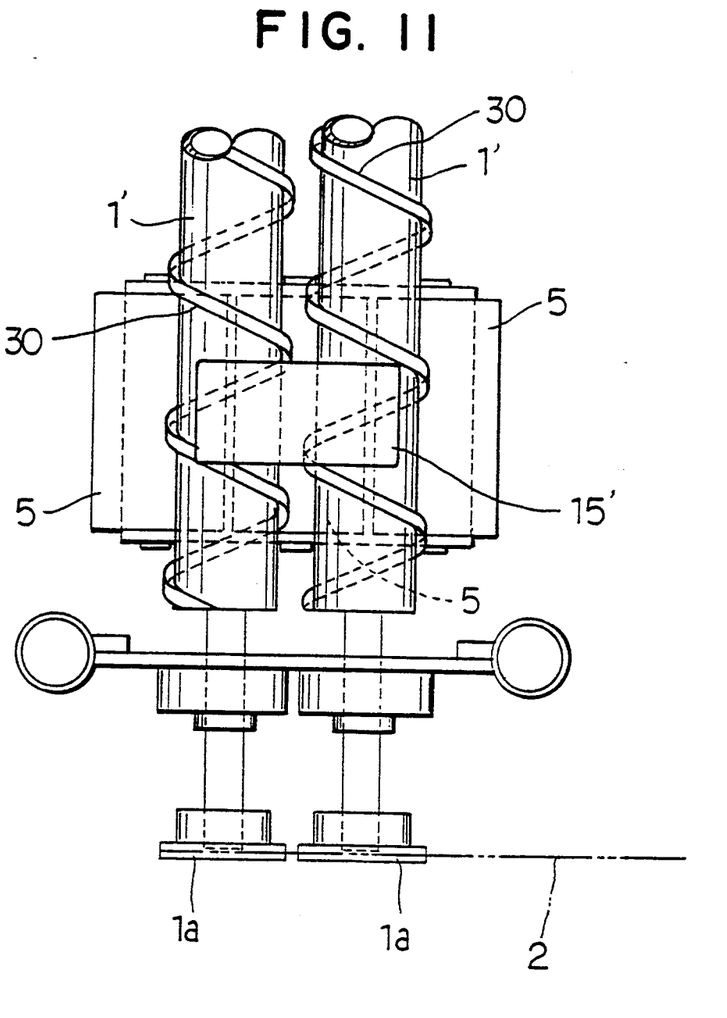
FIG. 11 is a plan view of an embodiment of the feed rollers having a feed rib.
Figure 12:
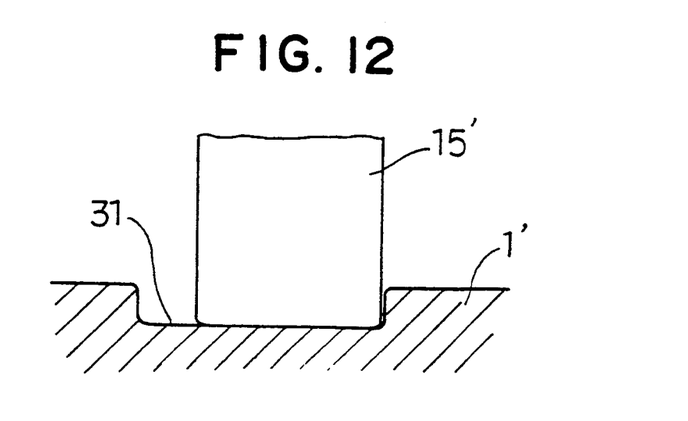
FIG. 12 is a view of the relation between the helical feed groove on the feed roller and the wheels of a cultivation bed.
Figure 13:
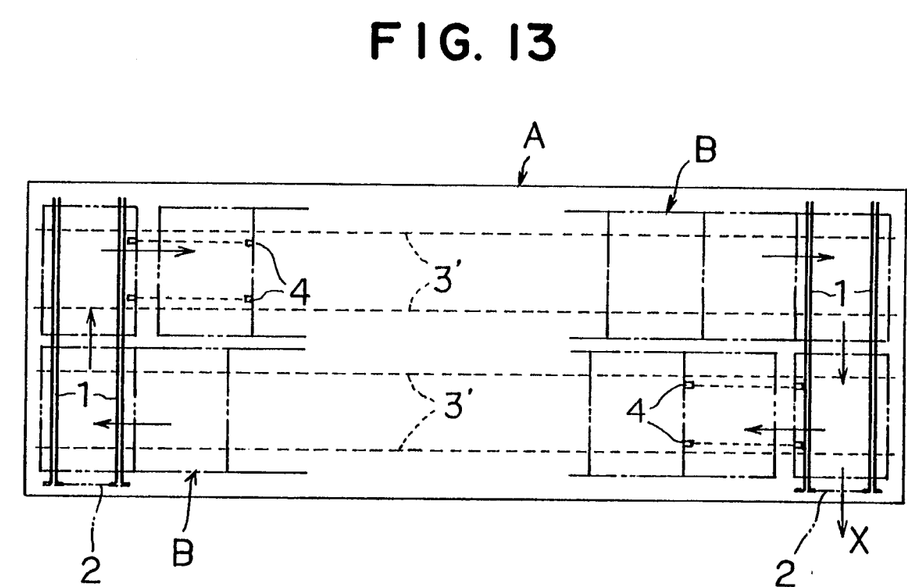
FIG. 13 is a plan view showing a simplified model of a further embodiment of the high-density type cultivation equipment.

Next, FIG. 11 through FIG. 13 show an embodiment wherein each of parallel pairs of feed rollers 1' that constitutes a transfer rail 1 is formed with a helical feed rib 30 on the outer surface with a suitable lead angle to force the wheels of the cultivation bed B which comes on said feed rollers 1' to move by a screw action. FIG. 12 shows a variation wherein the feed rollers 1' are formed with a helical feed groove 31 on the outer surface which receives wheels 15' and has an appropriate width to exert feeding force on the wheels 15'. In either case, the wheels 15' are moved positively by feeding screw action. The axles of the wheels (rail casters) therefore have no need to be declined with respect to the central axes of the feed rollers by a feed angle $\alpha$ but can be arranged to be parallel therewith. Thus the main rails 3 that are arranged to be parallel each other in the longitudinal direction of the site area A and the transfer rails 1 can be, as shown in FIG. 13, arranged to cross each other at a right angle and thereby can enhance the utilization rate of the site. It should be remarked that by forming a feed rib 30 or a feed groove 31 only on one of each pair of the feed rollers 1' instead of forming on the both, a similar feeding action can be expected.

Figure 14:
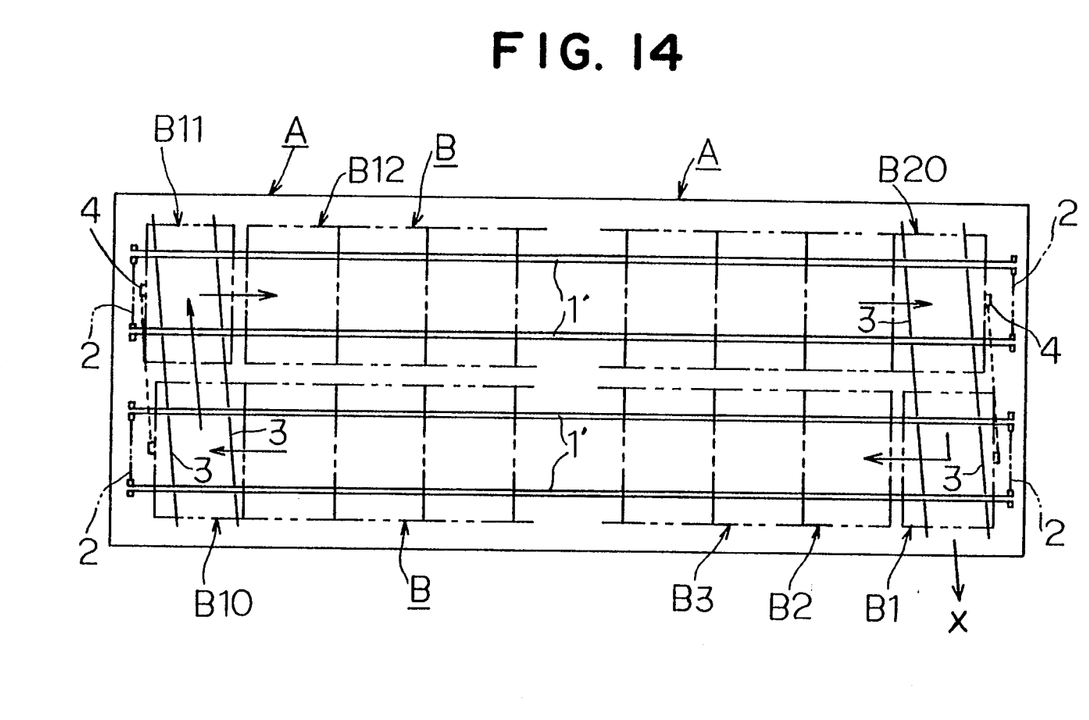
FIG. 14 is a plan view showing a simplified model of a still further embodiment of the high-density type cultivation equipment.

Finally, in the embodiment shown in FIG. 14, pairs of feed rollers 1',1' that rotate in the same direction at the same velocity are laid with a track gauge equal to the lateral distance of the wheels of the cultivation beds B and serve as the main rails 1. Rails 3 that consist of resin-coated steel pipe are provided as transfer rail tracks to connect one of the main rail tracks 1 with the adjacent track at substantially the same height with said main rails 1 to constitute tracks that have a gauge equal to the distance between the fore and rear wheels of the cultivation beds B and cross said main rail tracks at a right angle with the axles of said wheels. In this embodiment, the four wheels of each of the cultivation beds B are arranged to come right on the four corner points respectively of the parallelogram formed by crossing of the main rail track and the transfer rail track with the axles thereof fixed to be perpendicular to the central axes of said transfer rails. Further, as driving means to move a cultivation bed B that has reached the transfer rail track after moving on the main rails along the transfer rail track in the direction of the cyclic path, hook means are provided that engage detachably with structural members of the cultivation bed and B are driven in a predetermined stroke in the direction parallel to the transfer rails by a driving device (this driving means are not shown in the Figure).

In this embodiment, the cultivation beds B that are moved by feeding action of the pairs of parallel rollers do not have to be arranged in dense rows for forward movement by mutual pushing as in the embodiments of FIG. 1 or of FIG. 9 and 10. In an extreme case, the cultivation beds can be moved in the cyclic path independently with an ample clearance therebetween to avoid damage thereof.

In the embodiment of FIG. 14 too, it is possible to adopt flat lanes as the transfer rails as shown in FIG. 8 and rubber-tyre wheels or flat-rim wheels for the cultivation beds. Further, it is also possible to provide an intermittent transfer rail track at the middle of the main rail tracks as in the embodiment FIG. 9 and 10 or to arrange the transfer rails in a discontinuous staggering pattern in case long end side the site area.

Still further, it is possible in this embodiment to form a helical feed rib as shown in FIG. 11 or a helical feed groove as shown in FIG. 12 on the outer surface of each pair of the feed rollers constituting the main rail to generate forced feeding by screw action and thereby to arrange the main rails and transfer rails to cross each other at a right angle.

We claim:

1. A high-density type cultivation equipment comprising:
   cultivation beds for cultivating plants therewithin and having forward and rear wheels;

plural main rail tracks laid on a site area parallel to each other, wherein said cultivation beds are movable via said wheels, said wheels traveling on said main rail tracks, said main rail tracks positioned to have a clearance therebetween wide enough to avoid interference between said cultivation beds on two adjacent said main rail tracks, said cultivation beds being provided on said main rail tracks in plurality in dense rows and being adapted to be moved in a cyclic path through transference from one main rail track to the adjacent main rail track at the ends thereof;

a transfer rail track which connects an end of one of said main rail tracks to an end of an adjacent main rail track, said transfer rail track comprising two pairs of parallel feed rollers that are adapted for rotation in a common direction at a substantially identical velocity, said transfer rail track being arranged to have a track gauge related to the distance between the forward and rear wheels of said cultivation beds and being positioned to cross said main rail tracks at an angle inclined from a right angle by a feed angle and being positioned at substantially the same height with said main rail tracks; means to drive said feed rollers for rotation;

wherein the wheels of said cultivation beds are arranged such that axles thereof are fixed perpendicular to central axes of said main rail tracks when said wheels are positioned on corner points of a parallelogram formed by the crossing of said main rail tracks and said transfer rail track; and hook means adapted to detachably engage with structural members of said cultivation beds, said hook means being driven by a driving device in a predetermined stroke motion parallel to said main rail tracks for advancing in the direction of said cyclic path any of said cultivation beds that has moved on said transfer rail track from one of said main rail tracks to the adjacent main rail track thereof.

2. The high-density type cultivation equipment of claim 1 wherein the main rail tracks comprise flat lanes and the forward and rear wheels comprise rubber-wheels suited to run on said lanes.

3. The high-density type cultivation equipment of claim 1 or claim 2 further comprising an intermittent transfer rail track positioned at middle part of main rail track, for connecting the main rail track to an adjacent main rail track, said intermittent transfer rail track comprising two pairs of parallel feed rollers that are adapted for rotation in a common direction at a substantially identical velocity, said intermittent transfer rail track having a track gauge related to the distance between the forward and rear wheels of said cultivation beds and being positioned to cross said main rail tracks at an angle differing from a right angle by a feed angle and being positioned at substantially the same height with said main rail tracks, and wherein said hook means is adapted to detachably engage with structural members of said cultivation bed and is provided to be driven in a predetermined stroke motion parallel to said main rail tracks to advance in the direction of said cyclic path any of said cultivation beds that has moved on said intermittent transfer rail track from one of said main rail tracks to the adjacent main rail track thereof.

4. The high-density type cultivation equipment of claim 1 wherein the main rail tracks comprise flat lanes and the forward and rear wheels comprise flat-rim wheels suited to run on said lanes.

5. The high-density type cultivation equipment of claim 1 wherein the main rail tracks comprise lanes having a concave section and the forward and rear wheels comprise rubber wheels suited to run on said lanes.

6. The high-density type cultivation equipment of claim 1 wherein the transfer rail track comprises lanes having a concave section and the forward and rear wheels comprise flat-rim wheels suited to run on said lanes.

7. The high-density type cultivation equipment of claim 1 characterized in that the pairs of feed rollers that comprise the transfer rail track are provided on the outer surfaces thereof with a helical feed groove of an appropriate lead angle and wherein the main rail tracks and the transfer rail track cross each other at a right angle and the wheels of said cultivation beds are arranged such that the axles thereof are fixed to be parallel to the central axes of said feed rollers when said wheels are positioned on the corner points of a rectangle formed by the crossing of the main rail track and the transfer rail track.

8. A high-density type cultivation equipment comprising:

cultivation beds for cultivating plants therewithin and having wheels;

plural main rail tracks laid on a site area parallel to each other, wherein said cultivation beds are movable via said wheels, said wheels traveling on said main rail tracks, said main rail positioned to have a clearance therebetween wide enough to avoid interference between said cultivation beds on adjacent two of said main rail tracks, said cultivation beds being provided on said main rail tracks in plurality and being adapted to be moved in a cyclic path through transference from one main rail track to the adjacent main rail track at the ends thereof;

wherein ones of said main rail tracks comprise two pairs of parallel feed rollers that are adapted to be rotated in a common direction at a substantially identical velocity, have a track gauge corresponding to the distance between right and left wheels of said cultivation beds, and are provided with means to drive said feed rollers for rotation;

a transfer rail track which connects an end of one of said main rail tracks to an end of an adjacent main rail track, said transfer rail track having a track gauge related to the distance between forward and rear wheels of said cultivation beds and positioned to cross said main rail tracks at a right angle and at substantially the same height with said main rail tracks;

wherein the wheels of said cultivation beds are arranged such that axles thereof are fixed perpendicular to central axes of said transfer rail track when said wheels are positioned on corner points of a parallelogram formed by the intersection of said main rail tracks and said transfer rail track; and hook means adapted to detachably engage with structural members of said cultivation beds, said hook means being driven by a driving device in a predetermined stroke motion parallel to said transfer rail track for advancing in the direction of said cyclic path any of said cultivation beds that has reached said transfer rail track after moving on one of said main rail tracks toward the adjacent main rail track thereof.

9. The high-density type cultivation equipment of claim 1 or claim 4 characterized in that the pairs of feed rollers that comprise the main rail tracks or the transfer rail track are provided on the outer surfaces thereof with a helical feed rib of an appropriate lead angle and wherein the main rail tracks and the transfer rail track cross each other at a right angle and the wheels of said cultivation beds are arranged such that the axles thereof are fixed to be parallel to the central axes of said feed rollers when said wheels are positioned on the corner points of a rectangle formed by the crossing of the main rail track and the transfer rail track.

10. The high-density type cultivation equipment of claim 8 wherein the transfer rail track comprises flat lanes and the wheels comprise rubber wheels suited to run on said lanes.

11. The high-density type cultivation equipment of claim 8 further comprising an intermittent transfer rail track positioned at a middle part of a main rail track for connecting the main rail track to an adjacent main rail track, said intermittent transfer rail track having a track gauge related to the distance between forward and rear wheels of said cultivation beds and being positioned to cross said main rail tracks at a right angle, wherein the axles of the wheels are at substantially the same height with said main rail tracks, and further comprising driving means adapted to move a cultivation bed that has reached said transfer rail track after moving on one of the main rail tracks toward the adjacent main rail track thereof for advancing the cultivation bed along the cyclic path.

12. The high-density type cultivation equipment of claim 4 wherein the transfer rail track comprises flat lanes and the wheels comprise flat-rim wheels suited to run on said lanes.

13. The high-density type cultivation equipment of claim 4 wherein the transfer rail track comprises lanes having a concave section and the wheels comprise rubber wheels suited to run on said lanes.

14. The high-density type cultivation equipment of claim 8 wherein the transfer rail track comprises lanes having a concave section and the wheels comprise flat-rim wheels suited to run on said lanes.

15. The high-density type cultivation equipment of claim 8 characterized in that the pairs of feed rollers that comprise the main rail tracks are provided on the outer surfaces thereof with a helical feed groove of an appropriate lead angle and wherein the main rail tracks and the transfer rail track cross each other at a right angle and the wheels of said cultivation beds are arranged such that the axles thereof are fixed to be parallel to the central axes of said feed rollers when said wheels are positioned on the corner points of a rectangle formed by the crossing of the main rail track and the transfer rail track.

* * * * *